(12) United States Patent
Godard et al.

(10) Patent No.: US 11,987,390 B2
(45) Date of Patent: May 21, 2024

(54) MODULABLE INSTALLATION FOR ASSEMBLING AIRCRAFT, AND METHOD FOR CHANGING CONFIGURATION WITHIN SUCH AN INSTALLATION

(71) Applicant: Airbus Operations (S.A.S.), Toulouse (FR)

(72) Inventors: Cédric Godard, Toulouse (FR); Florian Collado, Toulouse (FR); Jacques Bouriquet, Toulouse (FR); Jean-Marc Datas, Toulouse (FR); Nicolas Darbonville, Blagnac (FR)

(73) Assignee: Airbus Operations (S.A.S.), Toulouse (FR)

( * ) Notice: Subject to any disclaimer, the term of this patent is extended or adjusted under 35 U.S.C. 154(b) by 429 days.

(21) Appl. No.: 17/165,076

(22) Filed: Feb. 2, 2021

(65) Prior Publication Data
US 2021/0237905 A1    Aug. 5, 2021

(30) Foreign Application Priority Data

Feb. 3, 2020 (FR) ...................................... 2001063

(51) Int. Cl.
| | | |
|---|---|---|
| *B64F 5/10* | (2017.01) | |
| *B64C 1/00* | (2006.01) | |
| *B64C 1/18* | (2006.01) | |

(52) U.S. Cl.
CPC ........ *B64F 5/10* (2017.01); *B64C 2001/0045* (2013.01); *B64C 1/18* (2013.01)

(58) Field of Classification Search
CPC ...... B64F 5/10; B65C 1/18; B65C 2001/0045
See application file for complete search history.

(56) References Cited

U.S. PATENT DOCUMENTS 10,723,485 B2 * 7/2020 Moore ................. B25J 11/0075

FOREIGN PATENT DOCUMENTS

| CN | 104 986 356 A | 10/2015 |
|---|---|---|
| DE | 94 10 194 U1 | 10/1995 |
| EP | 2 138 402 A2 | 12/2009 |
| WO | WO 96/00166 | 1/1996 |

OTHER PUBLICATIONS

Du et al., "Automating generation of the assembly line models in aircraft manufacturing simulation", 2013 IEEE International Symposium on Assembly and Manufacturing (ISAM), IEEE, Jul. 30, 2013 (Jul. 30, 2013), pp. 155-159.
French Search Report for Application No. 2001063 dated Oct. 13, 2020.

\* cited by examiner

*Primary Examiner* — Nirvana Deonauth
(74) *Attorney, Agent, or Firm* — KDW Firm PLLC

(57) ABSTRACT

To make an aircraft assembly installation modulable, the latter includes a floor, assembly stations distributed on the floor, and structures for accessing the aircraft during their assembly, each structure being mobile on the ground. The access structures include at least one access structure at an orbital junction between two fuselage sections, at least one access structure at the two junctions between a fuselage section and each of the two aircraft wings, and at least one access structure at the junctions between a rear fuselage section and tail units. In addition, the installation is designed to be able to adopt several distinct configurations, each having a different distribution of the access structures between the assembly stations.

9 Claims, 13 Drawing Sheets

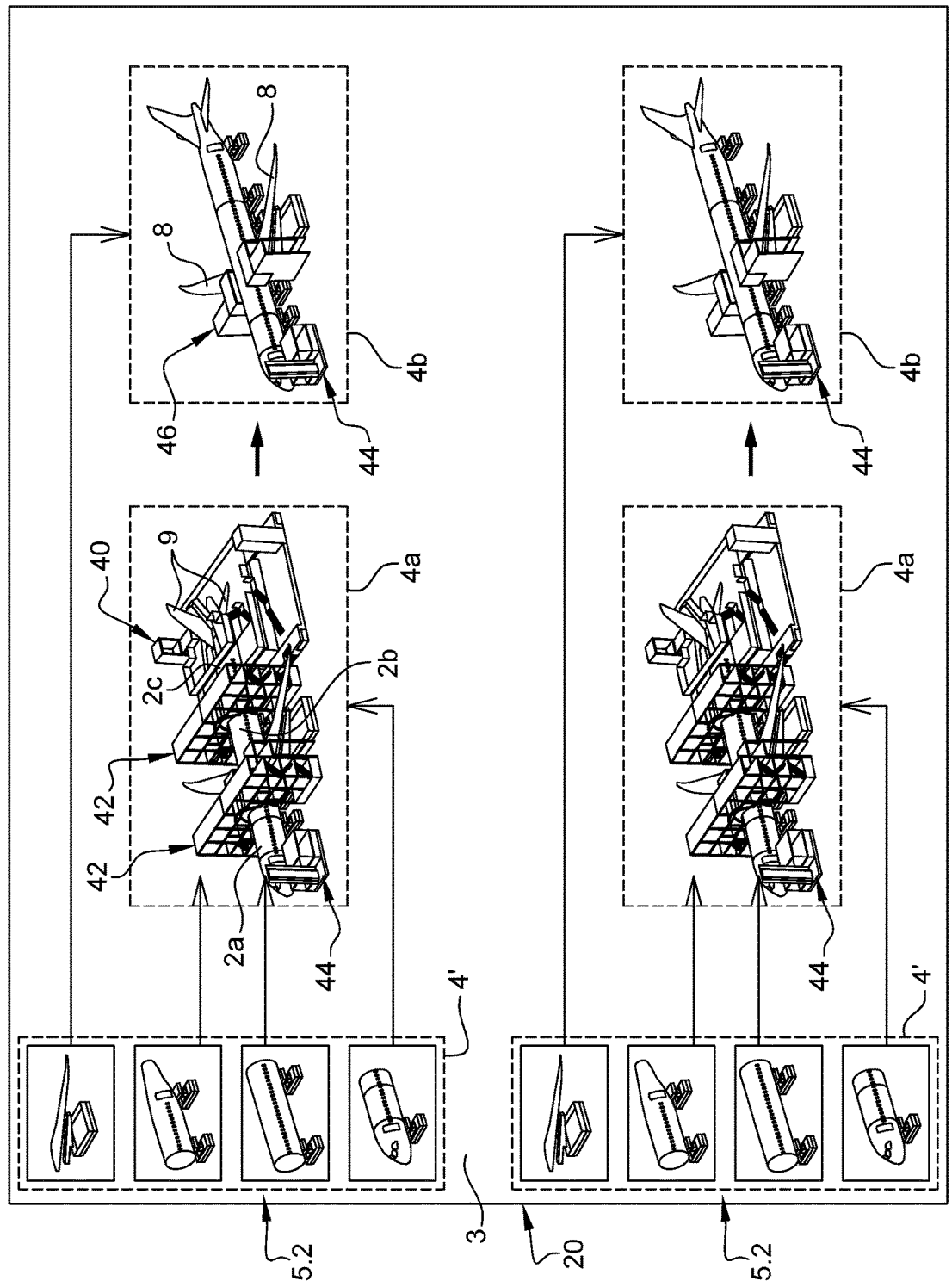

MODULABLE INSTALLATION FOR ASSEMBLING AIRCRAFT, AND METHOD FOR CHANGING CONFIGURATION WITHIN SUCH AN INSTALLATION

CROSS-REFERENCE TO RELATED APPLICATION

This application claims priority to French patent application FR 2001063 filed Feb. 3, 2020, the entire disclosure of which is incorporated by reference herein

TECHNICAL FIELD

The disclosure herein relates to an installation for assembling aircraft.

It relates more particularly to an installation dedicated to the end-to-end assembly of the various fuselage sections, to assembling the wings onto a central fuselage section, and to assembling tail units onto a rear fuselage section.

The disclosure herein preferably, although not exclusively, applies to an installation for assembling a fuselage section of a commercial aircraft.

BACKGROUND

In an installation dedicated to assembling aircraft there are generally provided one or more assembly lines functioning in parallel. Each line is formed of a plurality of successive assembly stations in each of which one or more assembly operations is carried out. This means for example an operation of assembling fuselage sections to one another, an operation of assembling wings to the central fuselage section, or again an operation of assembling tail units to the rear fuselage section.

At the start of an assembly campaign for a new aircraft design, a specific distribution of the operations between the various stations of the assembly line is decided on. However, this specific distribution of the operations may not perfectly match all circumstances liable to be encountered throughout the assembly campaign.

For example, at the start of the campaign the learning and technical mastery times may differ substantially as a function of the operations carried out on the line. Moreover, these learning and technical mastery times continue to be difficult to anticipate. Consequently, the specific distribution of the operations between the stations may prove not to be the optimum during this assembly campaign starting phase, potentially leading to problems of the throughput and overall performance of the assembly line. These problems on the assembly line may also remain after the phase of learning and technically mastering the various assembly operations, for example if one or more of those operations proves in the end to be more or less complicated than originally envisioned.

However, once the installation has been put into place, modifying the distribution of the operations between the various stations of the line is rarely envisioned, because it runs into a plurality of problems such as that of technical feasibility. Indeed, the various structures and the tools employed in each assembly station are generally extremely heavy and bulky and often installed permanently in their respective stations.

Moreover, other factors may lead to considering the specific distribution of the operations as unsuitable or less than the optimum under certain circumstances liable to be encountered during the assembly campaign. This means for example developing one or more heads of series, a change of production throughput on the line, or the possibility of a delay in supplying certain aircraft parts to be assembled.

Thus the fixed character of the present day assembly installations constitutes a real disadvantage, only enabling with very great difficulty these installations to be adapted to the various requirements and constraints liable to be encountered during an assembly campaign.

SUMMARY

To address this disadvantage, the disclosure herein has firstly for object a modulable (reconfigurable) aircraft assembly installation including a floor and a plurality of assembly stations distributed over the floor, the installation also including a plurality of structures for accessing the aircraft during their assembly, each structure of the plurality of access structures being mobile over the floor, and the plurality of access structures including:

at least one access structure at an orbital junction between two fuselage sections;

at least one access structure at the two junctions between a fuselage section and each of the two aircraft wings; and at least one access structure at at least one junction between a rear fuselage section and at least one tail unit.

Moreover, the modulable (reconfigurable) installation is designed or configured to be able to adopt a plurality of distinct configurations each having a different distribution of the access structures between the assembly stations.

Thus, by providing mobile access structures, those access structures to the aircraft may in effect be easily movable over the floor of the installation in order to carry out station reconfigurations matching the various requirements and constraints liable to be encountered during an aircraft design assembly campaign.

The disclosure herein preferably provides at least one of the following optional features, separately or in combination.

The installation is preferably designed or configured to adopt a first configuration defining at least one first assembly line and preferably a plurality of first assembly lines each including successively:

a first assembly station including the access structure to at least one junction between a rear fuselage section and at least one tail unit;

a second assembly station including at least one access structure to an orbital junction between two fuselage sections, and preferably a plurality of access structures to a plurality of respective orbital junctions between fuselage sections; and a third assembly station including the access structure to the two junctions between a fuselage section and each of the two aircraft wings.

The installation is preferably designed or configured to adopt a second configuration defining at least one second assembly line and preferably a plurality of second assembly lines each including successively:

a first assembly station including the access structure to at least one junction between a rear fuselage section and at least one tail unit and at least one access structure to an orbital junction between two fuselage sections and preferably a plurality of access structures to a plurality of respective orbital junctions between fuselage sections; and a second assembly station including the access structure to the two junctions between a fuselage section and each of the two aircraft wings.

The installation is preferably designed or configured to adopt a third configuration defining at least one third assembly line and preferably a plurality of third assembly lines each including successively:
  a first assembly station including at least one access structure to an orbital junction between two fuselage sections and preferably a plurality of access structures to a plurality of respective orbital junctions between fuselage sections; and
  a second assembly station including the access structure to the two junctions between a fuselage section and each of the two aircraft wings and the access structure to at least one junction between a rear fuselage section and at least one tail unit.

The installation is preferably designed or configured to adopt a fourth configuration defining at least one fourth assembly line and preferably a plurality of fourth assembly lines each including a first assembly station including:
  at least one access structure to an orbital junction between fuselage sections and preferably a plurality of access structures to a plurality of respective orbital junctions between fuselage sections;
  the access structure to the two junctions between a fuselage section and each of the two aircraft wings; and
  the access structure to at least one junction between a rear fuselage section and at least one tail unit.

Each access structure to the aircraft among the plurality of access structures preferably includes a plurality of working platforms and at least one staircase and/or at least one elevator.

Each access structure to the aircraft among the plurality of access structures preferably includes wheels for rolling over the floor or sliders for sliding over the same floor, such as at least one air cushion.

Each access structure to the aircraft among the plurality of access structures is preferably produced in the form of two lateral half-structures designed or configured to adopt a laterally separated from one another position in order to allow the introduction/extraction of the aircraft or of a part of the aircraft and a close together working position.

The installation preferably includes a mobile fuselage section support including:
  a chassis mobile over the floor of the installation;
  a front support cradle for the fuselage section mounted to be mobile longitudinally on the chassis;
  a rear support cradle for the fuselage section mounted to be mobile longitudinally on the chassis; and
  a plurality of jacks for maintaining the shape of the fuselage section, the maintaining jacks being mounted on the chassis and arranged longitudinally between the front cradle and the rear cradle and preferably oriented vertically or substantially vertically.

Finally, the disclosure herein also has for object a method for changing configuration in such an installation, consisting in or comprising passing from an initial configuration to a later configuration, the method including:
  at least one step of grouping, in the same assembly station of the later configuration, a plurality of access structures initially distributed in a plurality of distinct assembly stations of the initial configuration, this grouping being effected by moving over the floor at least one of the plurality of access structures initially distributed in the plurality of distinct assembly stations of the initial configuration; and/or
  at least one step of distributing, in a plurality of assembly stations of the later configuration, a plurality of access structures initially grouped in the same assembly station of the initial configuration, this distribution being effected by moving over the floor at least one of the plurality of access structures initially grouped in the same assembly station of the initial configuration.

Other advantages and features of the disclosure herein will become apparent in the nonlimiting detailed description below.

BRIEF DESCRIPTION OF THE DRAWINGS

This description will be given with reference to the appended drawings, in which;

FIG. 12 represents a schematic perspective view of the assembly installation in a second configuration;

DETAILED DESCRIPTION

Figure 1:
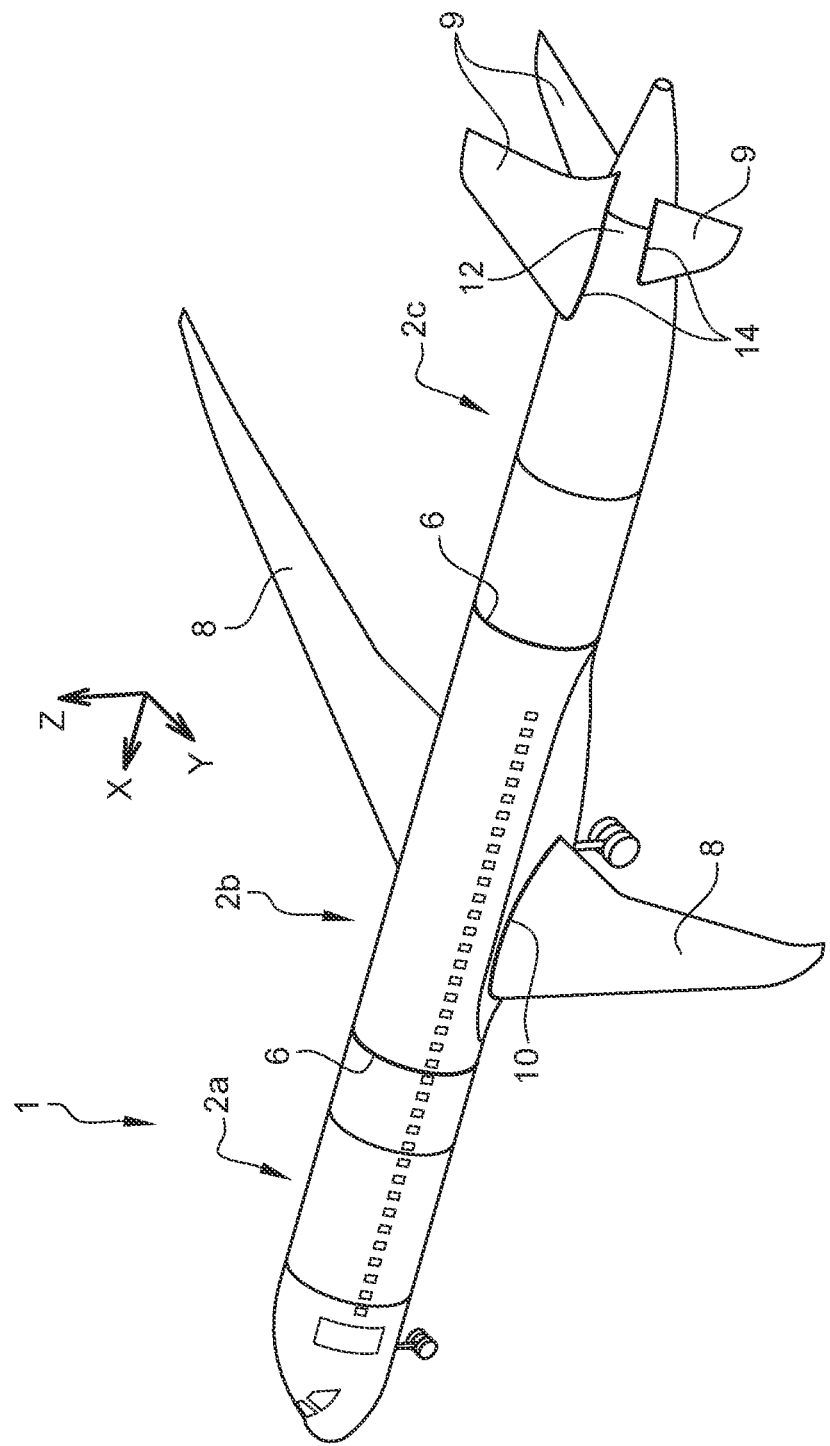
FIG. 1 represents a schematic perspective view of an aircraft intended to be obtained at the exit from an assembly installation in accordance with the disclosure herein.

FIG. 1 represents an aircraft 1 intended to be obtained at the exit from an assembly installation in accordance with the disclosure herein and a preferred embodiment of which will be described hereinafter. This installation is dedicated to a plurality of assembly operations, including the end-to-end assembly of a plurality of fuselage sections 2a, 2b, 2c. Here, this means a front fuselage section 2a including the nose section of the aircraft, a central fuselage section 2b and a rear fuselage section 2c incorporating the tail unit 12 of the fuselage. There is therefore provision for producing two orbital joints 6 respectively at the level of the two orbital junctions between these three sections 2a, 2b, 2c. Obviously the number of sections to be assembled end-to-end may be greater or lesser and conditions the number of orbital joints 6 to be produced in the installation.

The assembly operations include fixing the two wings 8 to the central fuselage section 2b by producing two wing joints 10 (only one of which can be seen in FIG. 1), respectively at the level of the two junctions between the section 2b and the two wings 8.

Finally, these operations also include assembling one or more tail units 9 to the tail 12, here namely a vertical stabilizer and two horizontal stabilizers. Thus, three tail unit joints 14 (only two of them being visible in FIG. 1) are produced, respectively at the level of the three junctions between the section 2c and the three tail units 9.

The aircraft 1 shown in FIG. 1 is associated with three mutually orthogonal directions, that is to say the longitudinal direction X of the aircraft, the transverse direction Y of that aircraft, and the direction Z of height. The direction X is oriented toward the front of the aircraft. The same frame of reference XYZ is associated with each station of the installation, the orientation of which is thus a function of the orientation of the aircraft or of the aircraft part in each of those stations to be described now.

Figure 2:
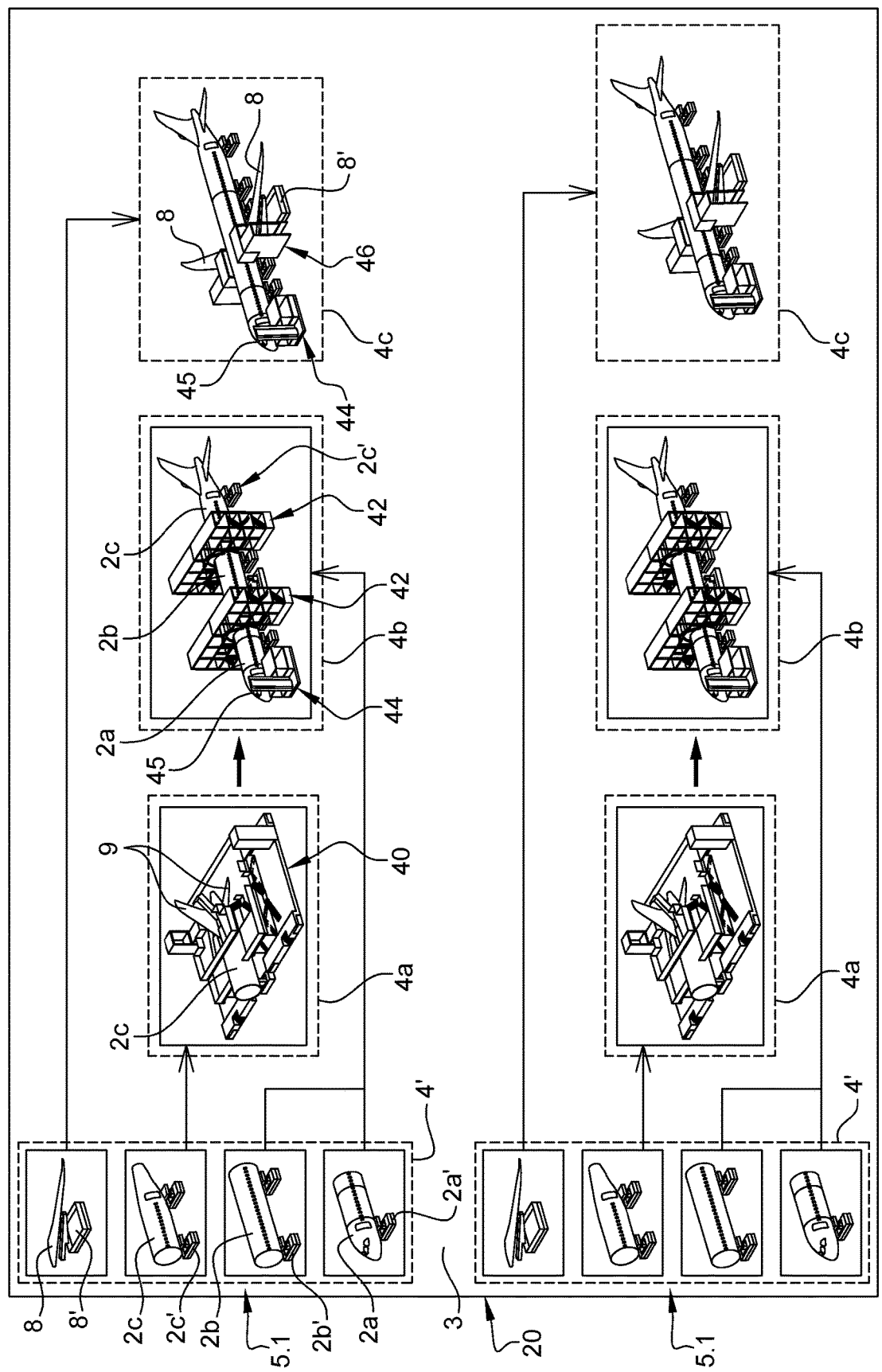
FIG. 2 represents a schematic perspective view of an aircraft assembly installation in accordance with a preferred embodiment of the disclosure herein with that installation in a first configuration.

FIG. 2 represents schematically an aircraft assembly installation 20 in accordance with a preferred embodiment of the disclosure herein. One of the particular features resides in its modulable character, enabling it to change configuration during a campaign of assembling an aircraft design.

This installation 20 includes a hangar and a plurality of assembly stations 4a, 4b, 4c distributed over the floor 3 of the hangar. In FIG. 2 the installation is shown in a first configuration preferably adopted at the start of the assembly campaign, that is to say as soon as the first aircraft, termed the "head of series", is assembled. In this first configuration each of the assembly stations 4a-4c is dedicated to the execution of a minimum number of operations in order best to isolate those operations from one another during the phase of learning and of technical mastery of the tools employed in those stations. This first configuration of the installation 20 is preferably maintained until in at least one of the stations the tools employed have been perfectly mastered.

For example, in the first configuration the stations 4a-4c are duplicated to form a plurality of first parallel assembly lines 5.1 in which aircraft can be assembled simultaneously. In this regard, it is noted that in each of these first lines 5.1 the stations 4a-4c may be aligned with one another as schematically represented in FIG. 2. Alternatively, however, other non-linear arrangements could be adopted for those same stations without departing from the scope of the disclosure herein. The same applies to the other configurations that will be described later.

Here two first assembly lines 5.1 are represented, but this number could be higher depending on the space available on the floor 3 of the installation. Each first line 5.1 has an identical or similar design, with a space 4' for storing aircraft parts to be assembled. This storage space 4' may moreover be common to all the first assembly lines 5.1. It corresponds to a zone in which are stored all the aircraft parts to be assembled, including the wings 8 each resting on a support 8' mobile over the floor 3 and the three fuselage sections 2a, 2b, 2c respectively resting on supports 2a', 2b', 2c' mobile over the floor 3.

Each of the mobile supports 8', 2a', 2b', 2c' may be produced as a plurality of modules, preferably one or more modules rolling over the floor thanks to drive wheels and/or follower wheels. Alternatively, movements by sliding over the floor 3 may be envisioned, for example with the aid of air cushions integrated into these mobile supports for wings and fuselage sections.

The mobile supports 8', 2a', 2b', 2c' are moved over the floor 3 manually or preferably in an automated manner in the hangar thanks in particular to a geolocation system enabling the aircraft parts to be brought to the appropriate stations.

Figure 3:
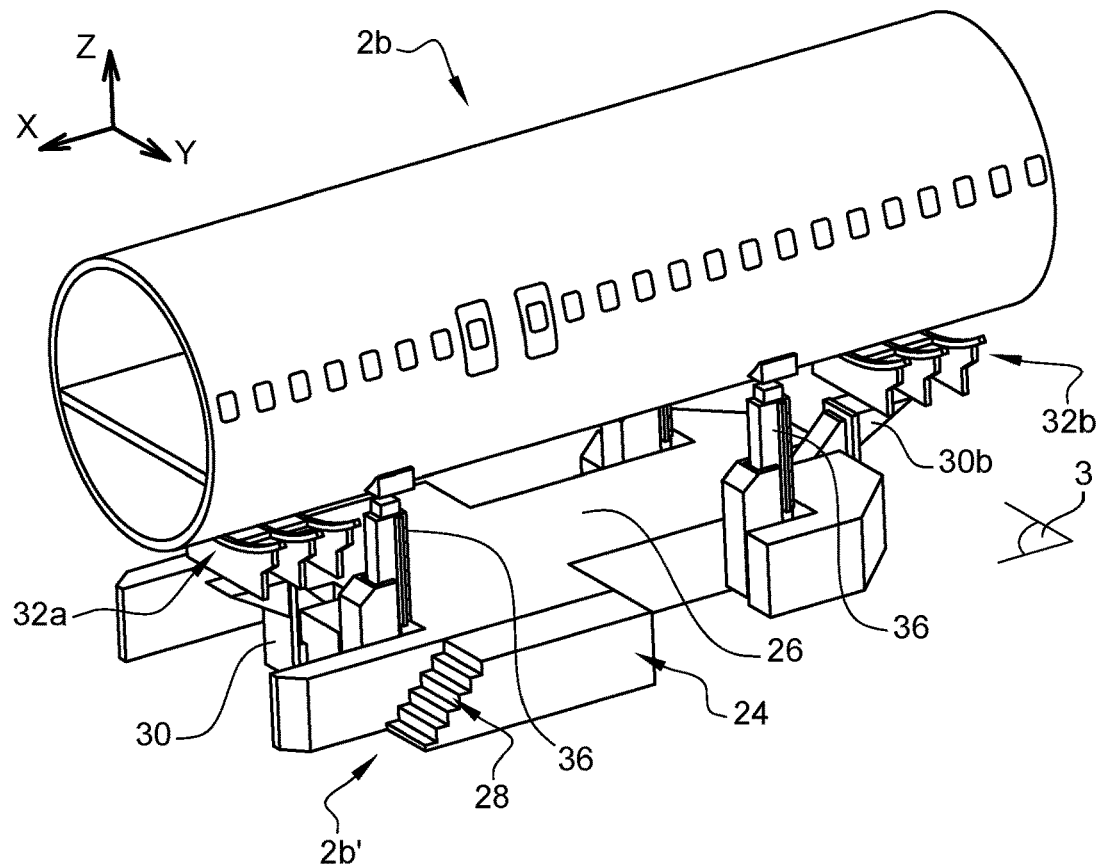
FIG. 3 represents a perspective view of a central fuselage section intended to be assembled in the installation shown in FIG. 2, the central section being carried by a mobile support forming an integral part of the installation.
Figure 4:
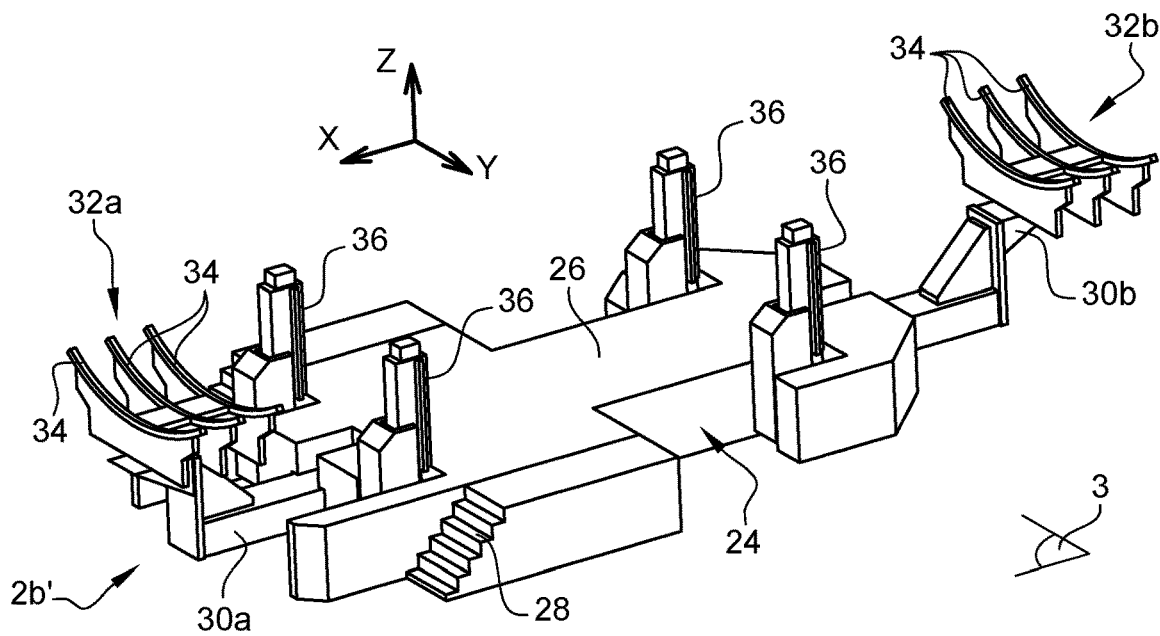
FIG. 4 represents a perspective view of the fuselage section mobile support shown in the previous figure.

FIGS. 3 and 4 represent one possible embodiment of one of the mobile supports, here corresponding to the mobile support 2b' of the central fuselage section 2b. However, this improved type of support could be used to support and to move any other fuselage section.

The mobile support 2b' firstly includes a mobile chassis 24 equipped with elements (not visible) rolling over the floor 3. This chassis 24 has large dimensions, in particular in the direction X where its length may reach at least 50% of the total length of the fuselage section that is supported. The upper part of the chassis 24 may form a working platform 26 on which operatives are able to circulate in order to carry out assembly or maintenance operations. A staircase 28 may be integrated into this chassis 24 to establish access between the platform 26 and the floor 3.

At the front end of the mobile chassis 24 the support 2b' includes a front arm 30a mounted to be mobile longitudinally on the same chassis 24. In an analogous manner, at the rear end of the mobile chassis 24 the support 2b' includes a rear arm 30b mounted to be mobile longitudinally on the same chassis 24.

The front end of the front arm 30a includes a front cradle 32a to support the fuselage section including for example a plurality of support members 34 spaced longitudinally from one another and each having a shape complementary to that of the fuselage portion to be supported. Likewise, the rear end of the rear arm 30b carries a rear cradle 32b to support the fuselage section also including a plurality of support members 34 spaced longitudinally from one another. Thanks to the mobility of the arms 30a, 30b in the direction X, the mobile support 2b' can be adapted to suit fuselage sections with very different lengths.

To limit the risks of deformation of the fuselage section 2b supported at its opposite longitudinal ends by the two cradles 32a, 32b, the support 2b' is preferably equipped with a plurality of jacks 36 enabling the shape of the section 2b to be maintained and in particular limiting deformation thereof in bending. These are preferably vertical or substantially vertical jacks 36 mounted on the mobile chassis 24 and arranged between the two cradles 32a, 32b in the direction X. By controlling how far each of these jacks 36, of which there are four for example, is extended it is possible to create as many supplementary points of contact with the exterior surface of the fuselage section with the aim of maintaining its shape as close as possible to its nominal shape.

Returning to FIG. 2, the first assembly station 4a of each first line 5.1 is dedicated to assembling tail units 9 onto the rear fuselage section 2c, that is to say to the production of the tail unit joints 14 shown in FIG. 1. This section 2c is therefore delivered to the station 4a with the aid of the mobile support 2c', and the tail units 9 are delivered to this station for fixing. To this end, the first station 4a includes an access structure 40 to the junctions between the rear fuselage section 2c and the tail units 9. This access structure 40 will be described in detail with reference to FIGS. 5 and 6.

The second assembly station 4b is dedicated to assembling the three fuselage sections 2a, 2b, 2c end-to-end, that is to say to producing the two orbital joints 6 shown in FIG. 1. To this end, the second station receives from the first station the section 2c equipped with its tail units 9 and also receives the other two fuselage sections 2a, 2b from the storage space 4'. The second station 4b therefore includes an access structure 42 to the orbital junction between the two sections 2a, 2b arranged end-to-end and another access structure 42 to the orbital junction between the two sections 2b, 2c also arranged end-to-end. These access structures 42 are identical or similar and one of them will be described in detail with reference to FIGS. 7 through 9. Alternatively, a single access structure 42 may be provided for producing the two orbital joints. In this kind of configuration the access structure 42 may for example be mobile longitudinally in the second station 4b in such a manner as to be moved between the two orbital junctions formed by the alignment of the remaining three sections fixed in this station.

The second station 4b may equally be equipped with an elevator 44 adapted to be mobile over the floor 3 in the vicinity of the cockpit 45 defined by the front fuselage section 2a. This elevator 44 enables loading of hardware, equipment and/or tools into the fuselage.

Finally, the third and final assembly station 4c is dedicated to assembling the two wings 8 onto the central fuselage section 2b, that is to say to producing the two wing joints 10 shown in FIG. 1. To this end, the third station 4c receives from the second station the three sections 2a, 2b, 2c assembled and equipped with the tail units 9 and also receives the two wings 8 from the storage space 4'. The first station 4c thus includes an access structure 46 to the junction between the central section 2b and each of the wings 8. This access structure 46 will be described in detail with reference to FIGS. 10 and 11. Here the third station 4c may also be equipped with an elevator 44 adapted to be mobile over the floor 3 in the vicinity of the cockpit 45 for loading hardware, equipment and/or tools into the fuselage.

All the access structures 40, 42, 46 referred to hereinabove have the particular feature of being mobile over the floor 3 in such a manner as to be easily able to change installation configuration by differently grouping/distributing the structures 40, 42, 46 between the stations. For example, each of these access structures 40, 42, 46 is equipped with wheels to roll over the floor or sliders for sliding over the same floor, such as one or more air cushions.

Figure 5:
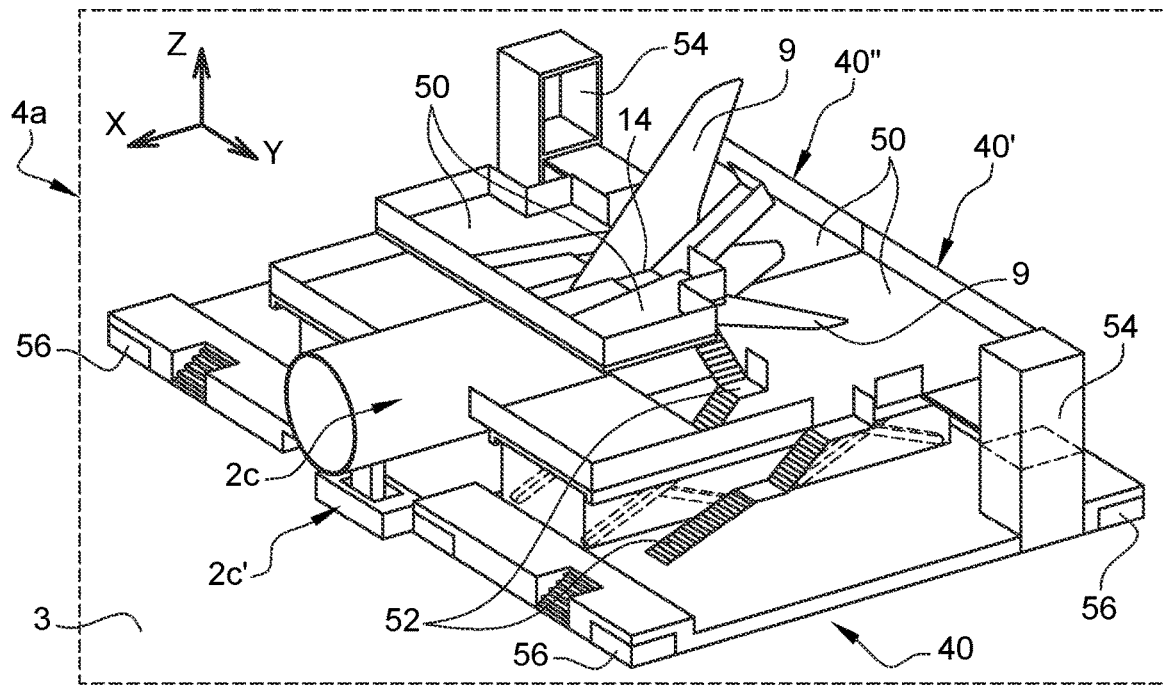
FIG. 5 represents a perspective view of the first assembly station of the installation in the first configuration shown in FIG. 2.
Figure 6:
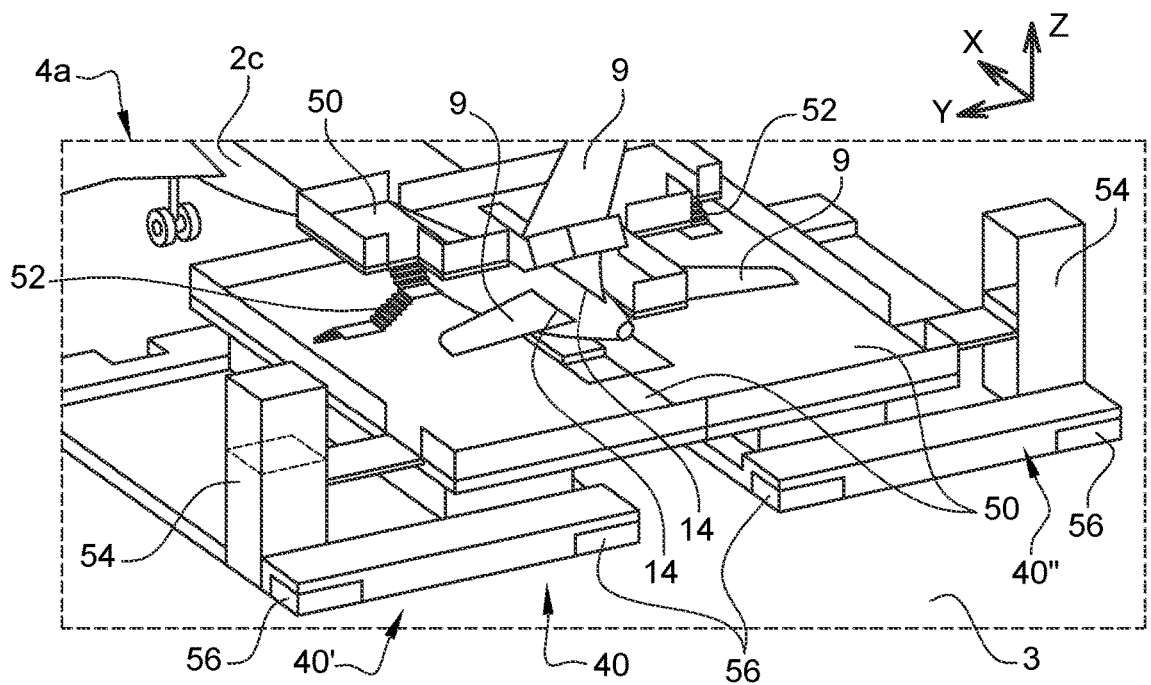
FIG. 6 also represents a perspective view of the first assembly station of the installation seen from a different angle.

Referring to FIGS. 5 and 6, there is represented the first assembly station 4a with its access structure 40 to the tail units 9 to produce the tail unit joints 14. The access structure 40 is produced in the form of two lateral half-structures 40', 40" represented in FIGS. 5 and 6 in a close together working position. These two half-structures 40', 40" are of symmetrical design with respect to a plane XZ. Each includes a plurality of working platforms 50 on which operatives can circulate. These platforms 50 may also serve to support tools for carrying out the scheduled operations in the first station 4a. The platforms 50 may be at different heights and staircases 52 and/or elevators 54 (or freight elevators) may connect these various levels of each half structure 40', 40". Each of them is equipped with wheels 56 allowing them to move over the floor 3. This mobility serves where applicable to changing installation configuration as mentioned above, but also serves in the first station 4a to pass from the close together working position to a laterally separated position of the two half-structures 40', 40" (position not represented). To reach this latter position, the two half-structures 40', 40" are each moved in the direction Y toward the exterior of the station 4a in such a manner as to move laterally away from one another. This lateral separation enables a space to be formed between these two half structures 40', 40" allowing introduction and extraction of the rear fuselage section 2c. Once introduction or extraction has been effected, the two half-structures 40', 40" may be moved toward one another again in order to be brought into their close together working position shown in FIGS. 5 and 6.

The operatives are therefore able to circulate in the first station 4a and load tools onto the platforms 50 of the access structure 40 in order to produce the tail unit joints 14.

Figure 7:
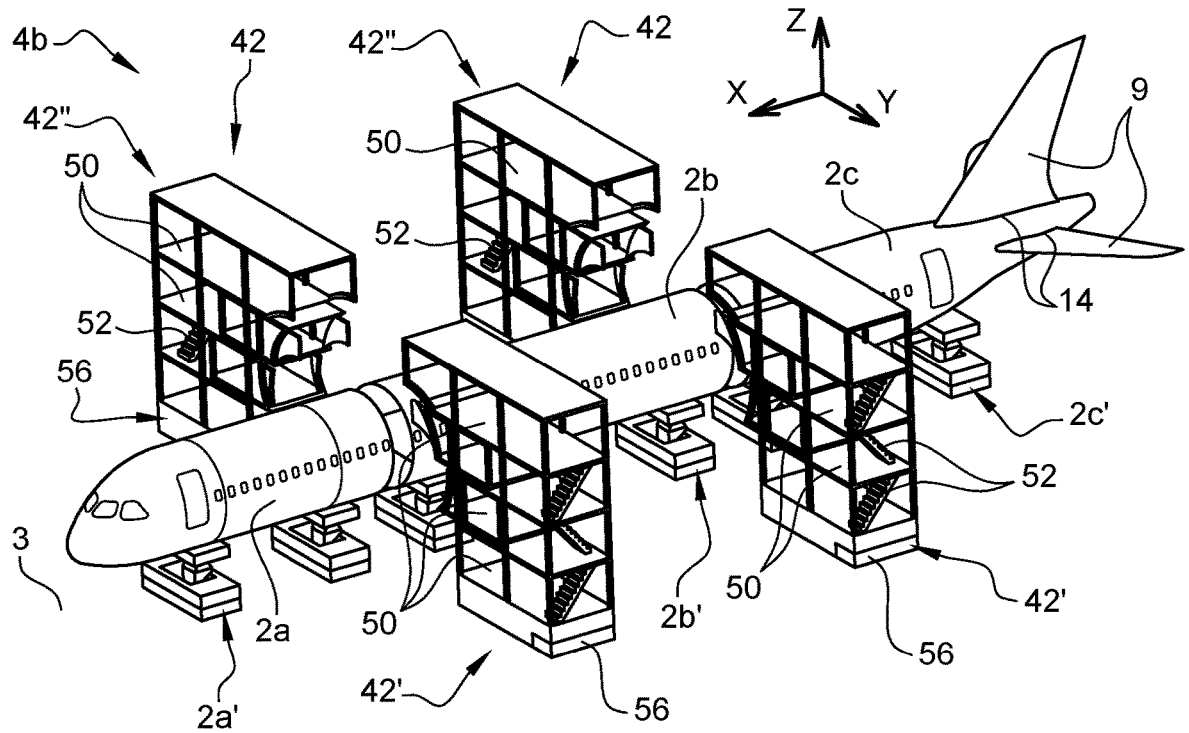
FIG. 7 represents a perspective view of the second assembly station of the installation in the first configuration shown in FIG. 2 with the access structure shown in a separated position enabling the introduction/extraction of the aircraft or of a part of the aircraft.
Figure 8:
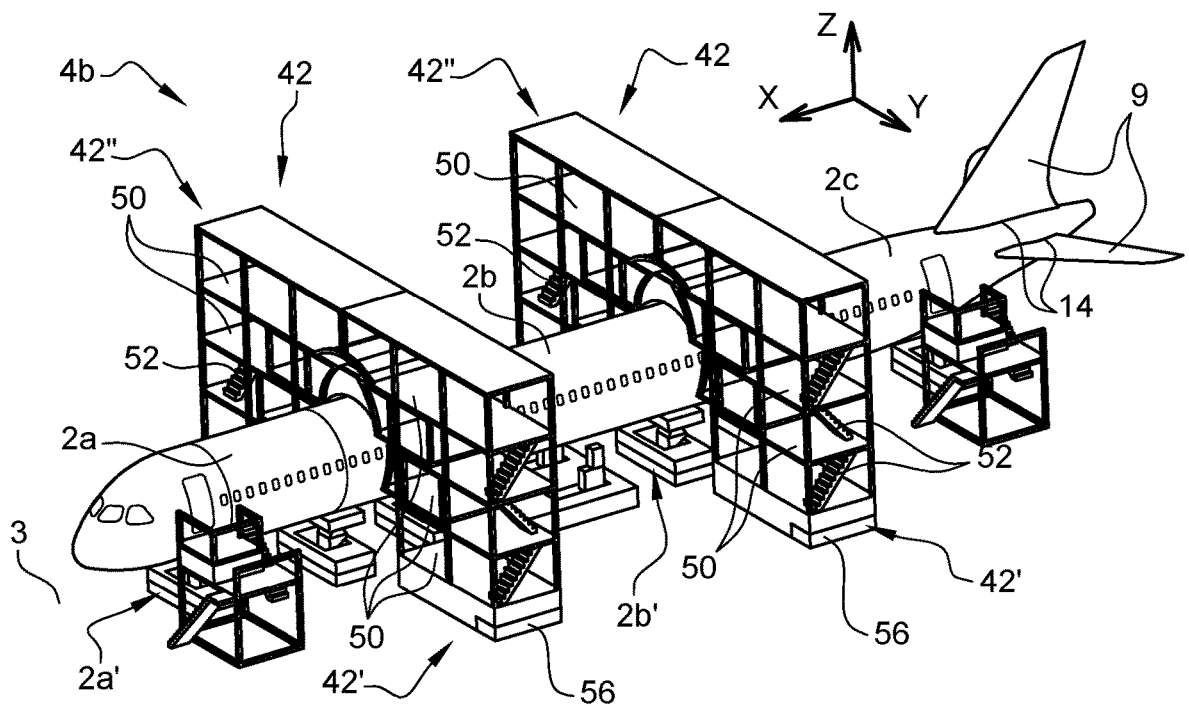
FIG. 8 also represents a perspective view of the second assembly station of the installation in the first configuration shown in FIG. 2 with the access structure shown in the close together working position.
Figure 9:
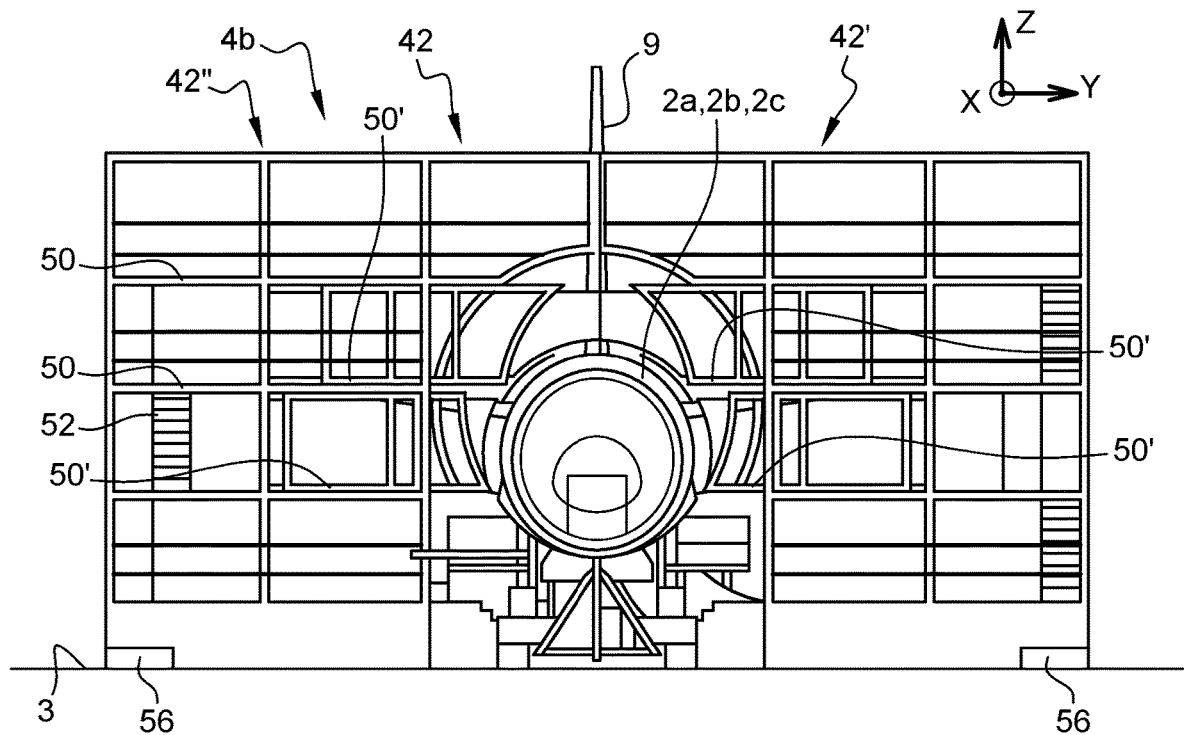
FIG. 9 represents a front view of the second assembly station shown in the previous figure.

Referring to FIGS. 7 and 8, there is represented the second assembly station 4b with its two access structures 42 to the orbital junctions between the ends of the three fuselage sections 2a, 2b, 2c aligned in the direction X. The two access structures 42 are of identical or similar design. Each of them is produced in the form of two lateral half-structures 42', 42" represented in a close together working position in FIG. 8 and in a position laterally separated from one another in FIG. 7. These two half-structures 42', 42" are of symmetrical design with respect to a plane XZ. Each includes a plurality of working platforms 50 on which operatives are able to circulate. These platforms 50 may also serve to support tools for carrying out the scheduled operations in the second station 4b. The platforms 50 may be at different heights and staircases 52 and/or elevators (or freight elevators) can connect these various levels of each half-structure 42', 42". Each of them is equipped with wheels 56 allowing them to move over the floor 3. This mobility where applicable serves to change installation configuration but also serves in the second station 4b in such a manner as to pass from one to the other of the two relative positions mentioned hereinabove. For each access structure 42 the principle remains identical to that explained in the context of the access structure 46, namely to provide lateral separation between the half-structures 42', 42" to allow introduction and extraction of the sections 2a, 2b, 2c to be assembled. Here also, once introduction has been effected, the two half-structures 42', 42" may be moved toward one another again in order to be returned to their close together working position shown in FIGS. 8 and 9. FIG. 9 also shows that each half-structure 42', 42" may be equipped with one or more mobile platforms 50' movable transversely relative to a framework of each half-structure 42', 42". These mobile platforms 50' enable adaptation to suit different fuselage diameters and shapes without necessitating transverse movement of the half-structures 42', 42" over the floor 3.

The operatives can therefore circulate in the second station 4b and load tools onto the platforms 50 of the two access structures 42 in order to effect the two orbital joints between the three sections 2a, 2b, 2c.

Figure 11:
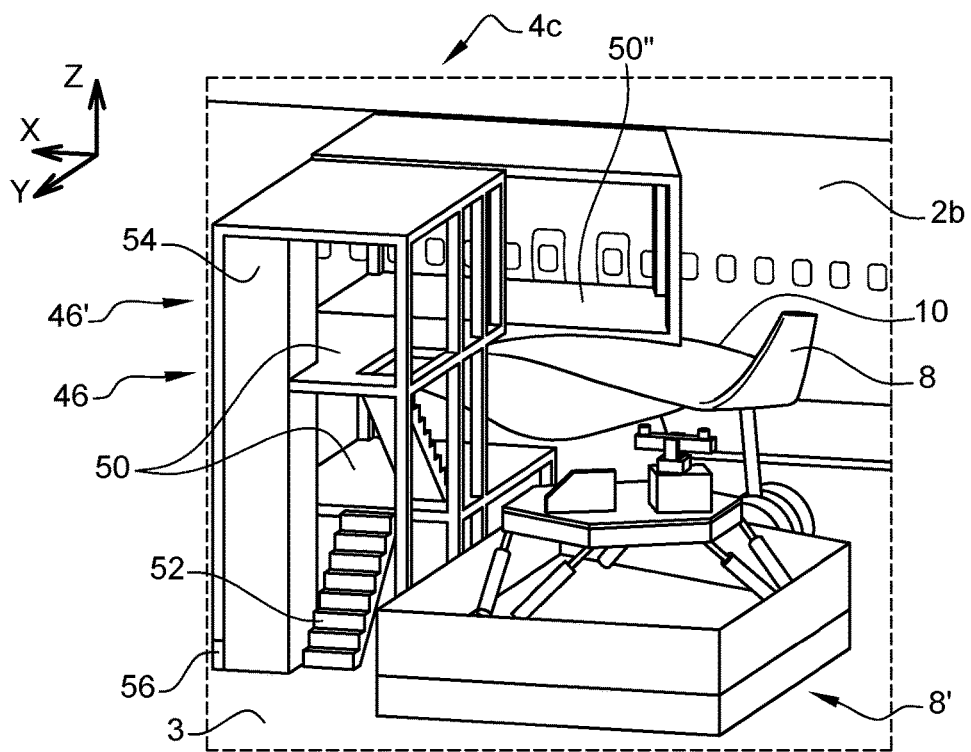
FIG. 11 also represents a perspective view of the third assembly station of the installation, seen from a different angle.
Figure 10:
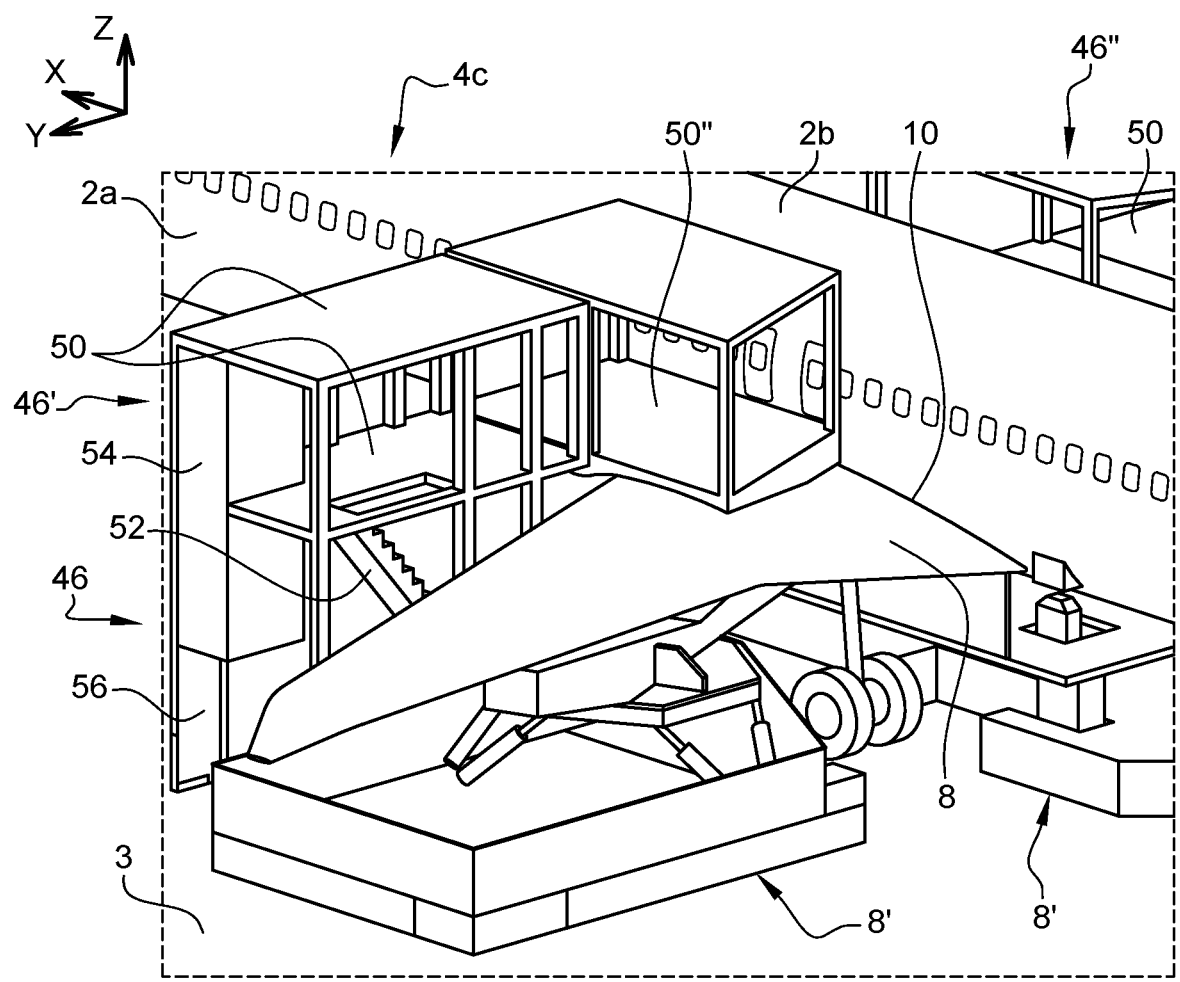
FIG. 10 represents a perspective view of a part of the third assembly station of the installation in the first configuration shown in FIG. 2.

Referring to FIGS. 10 and 11, there is represented the third assembly station 4c with its access structure 46 to the wings 8 for effecting the wing joints 10 with the central fuselage section 2b. The access structure 46 is produced in the form of two lateral half-structures 46', 46" represented in FIGS. 10 and 11 in a close together working position (only the half-structure 46' being entirely visible in FIGS. 10 and 11). These two half-structures 46', 46" are of symmetrical design with respect to a plane XZ. Each includes a plurality of working platforms 50 on which operatives are able to circulate. These platforms 50 may also serve to support tools for executing the scheduled operations in the third station 4c. The platforms 50 may be at different heights and staircases 52 and/or elevators 54 (or freight elevators) may connect these various levels of each half-structure 46', 46". Each of them is equipped with wheels 56 enabling them to move over the floor 3. This mobility serves where applicable to change installation configuration as mentioned above but also serves in the second station 4a to pass from the close together working position to a laterally separated position of the two half-structures 46', 46" (position not represented). To reach this final position the two half structures 46', 46" are each moved in the direction Y toward the outside of the station 4c in such a manner as to be moved laterally away from one another. This lateral separation enables a space to be formed between these half-structures 46', 46" allowing introduction and extraction of the assembled fuselage sections 2a, 2b, 2c. Once introduction or extraction has been effected the two half-structures 46', 46" can be moved toward one another again in order to be returned to their close together working position shown in FIGS. 10 and 11.

Each half-structure 46', 46" may be equipped with one or more mobile platforms 50" movable longitudinally above an associated wing 8 relative to a framework of the half-structure 46', 46". These mobile platforms 50" enable as close as possible movement toward the upper part of the wing joints 10 to be produced.

The operatives are thus able to circulate in the first station 4c and load tools onto the platforms 50 of the access structure 46 in order to produce the wing joints 10.

As mentioned above the mobility of the access structures 40, 42, 46 easily enables installation configuration change. Such configuration changes may be triggered for a number of reasons during the assembly campaign. For example, when some of the operations carried out in the various stations of the first configuration are mastered after a learning phase a plurality of those operations may then be grouped in one or more stations of the installation that are then in a distinct configuration. Such grouping of a plurality of operations in the same station enables reduction of the length of the assembly line and reduces the footprint in the hangar. The space freed up on the floor can advantageously be used to carry out other operations, for example by installing a supplementary assembly line.

Another example of what may trigger a change of configuration is an increase in the production throughput, which may lead to grouping some operations in the stations, thereby reducing their number per assembly line.

Finally, another example is taking into account a delay in delivering a part of the aircraft to be assembled on the line. If such a delay occurs the line can be blocked and this can lead to serious losses of efficiency. It then becomes possible to effect one or more new operations at a given station in such a manner as to limit these losses of efficiency. These new operations are easily carried out by merely moving the corresponding access structures and tools.

Obviously, when changing the configuration of the installation 20, operations can be grouped together. Conversely, however, distributing in different stations operations initially centralized in the same station may be envisioned.

By way of nonlimiting example there will be described hereinafter a plurality of other distinct configurations for the installation 20.

Firstly, referring to FIG. 12, there is diagrammatically represented the installation 20 in a second configuration that is preferably adopted during a phase of greater technical maturity in the assembly campaign. This second configuration is represented with two assembly lines 5.2 on the floor 3 but the number of these lines functioning simultaneously could be higher.

In this second configuration of the installation 20 the first station 4a corresponds to grouping the first and second stations of the first configuration described above. Moreover, the second station 4b of this second configuration corresponds to the third station of the first configuration.

Thus the first station 4a of the second configuration is dedicated to assembling the tail units 9 onto the rear fuselage section 2c and to end-to-end assembly of the three sections 2a, 2b, 2c. Consequently, the first station 4a receives simultaneously the access structure 40 to the junctions between the rear fuselage section 2c and the tail units 9 and the two access structures 42 to the two orbital junctions between the three fuselage sections 2a, 2b, 2c arranged end-to-end.

Finally, a second station 4b of the second configuration is dedicated to assembling the two wings 8 onto the central fuselage section 2b, that is to say to producing the two wing joints 10 shown in FIG. 1. To this end the second station 4b receives from the first station 4a the three assembled sections 2a, 2b, 2c equipped with the tail units 9 and also receives the two wings 8 from the storage space 4'. The second station 4b therefore include the access structure 46 to the junction between the central section 2b and each of the two wings 8.

In the second configuration in FIG. 12 all the aforementioned access structures 40, 42, 46 are therefore the same as described in the first configuration but arranged differently between the different stations after moving them by rolling them over the floor 3.

The first and second stations 4a, 4b each of them may also include an elevator 44 arranged to be mobile over the floor 3 in the vicinity of the cockpit to load hardware, equipment and/or tools into the fuselage.

Figure 13:
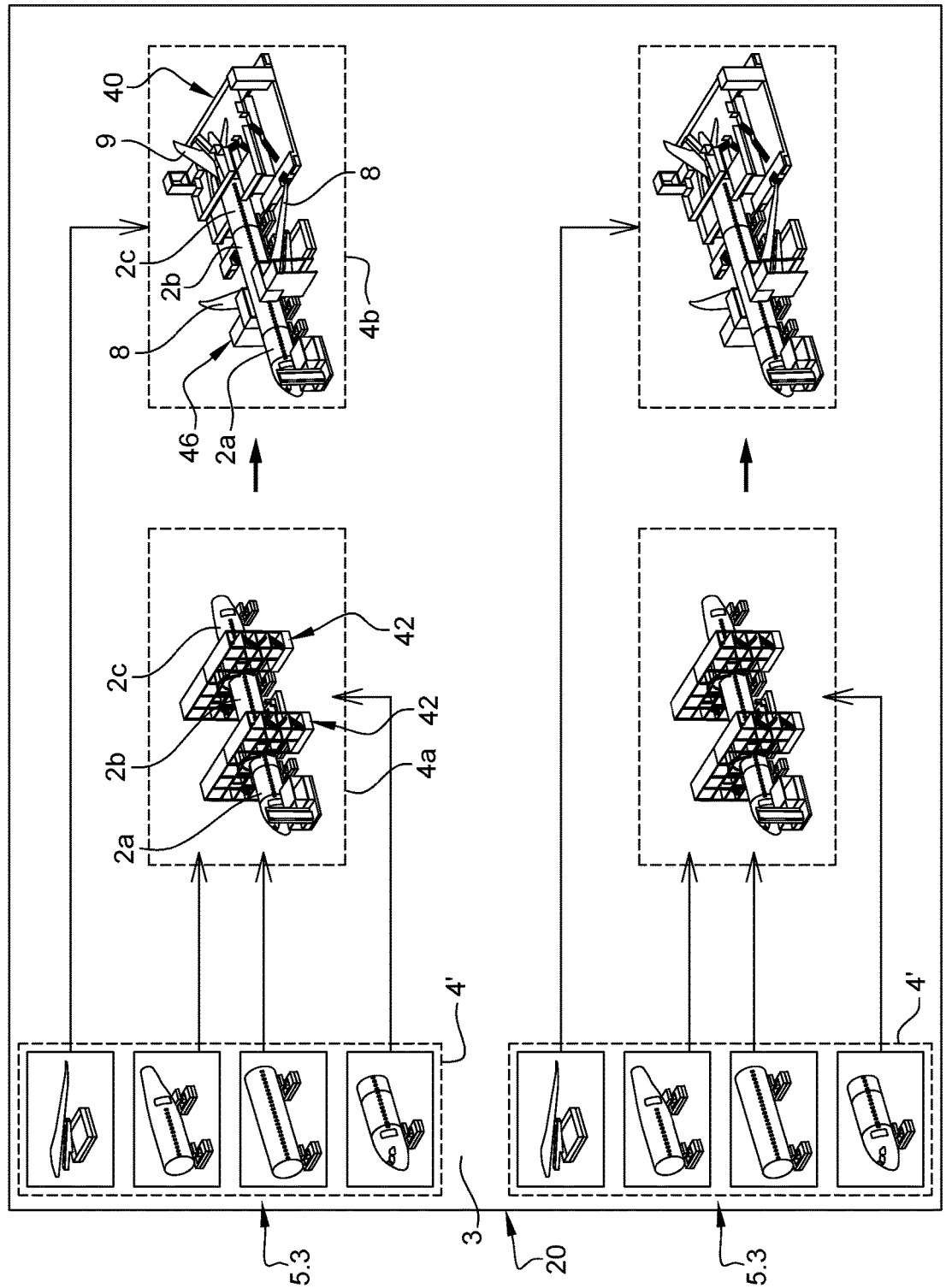
FIG. 13 represents a schematic perspective view of the assembly installation in a third configuration.

Referring now to FIG. 13, there is schematically represented the installation 20 in a third configuration, preferably also adopted during a phase of greater technical maturity of the assembly campaign. This third configuration is represented with two assembly lines 5.3 on the floor 3 but the number of these lines functioning simultaneously could be higher.

In this third configuration of the installation 20 the first station 4a corresponds to the second station 4b of the first configuration. Moreover, the second station 4b of this third configuration corresponds to the grouped first and third stations of the first configuration described above.

Thus the first station 4a receives the three sections 2a, 2b, 2c arranged end-to-end and also receives the two access structures 42 to the two orbital junctions between the three fuselage sections 2a, 2b, 2c.

For its part the second station 4b of the third configuration is dedicated to assembling the tail units 9 onto the rear fuselage section 2c and to assembling the wings 8 onto the central section 2b. Consequently, the second station 4b receives from the first station 4a the three assembled sections 2a, 2b, 2c. It also simultaneously receives the access structure 40 to the junctions between the rear fuselage section 2c and the tail units 9 and the access structure 46 to the junction between the central section 2b and each of the two wings 8.

Here again, all the access structures 40, 42, 46 are the same as those described in the first and second configurations but arranged differently between the different stations after moving them over the floor 3.

The first and second stations 4a, 4b of the third configuration may also each include an elevator 44 arranged to be mobile over the floor 3 in the vicinity of the cockpit to load hardware, equipment and/or tools into the fuselage.

Figure 14:
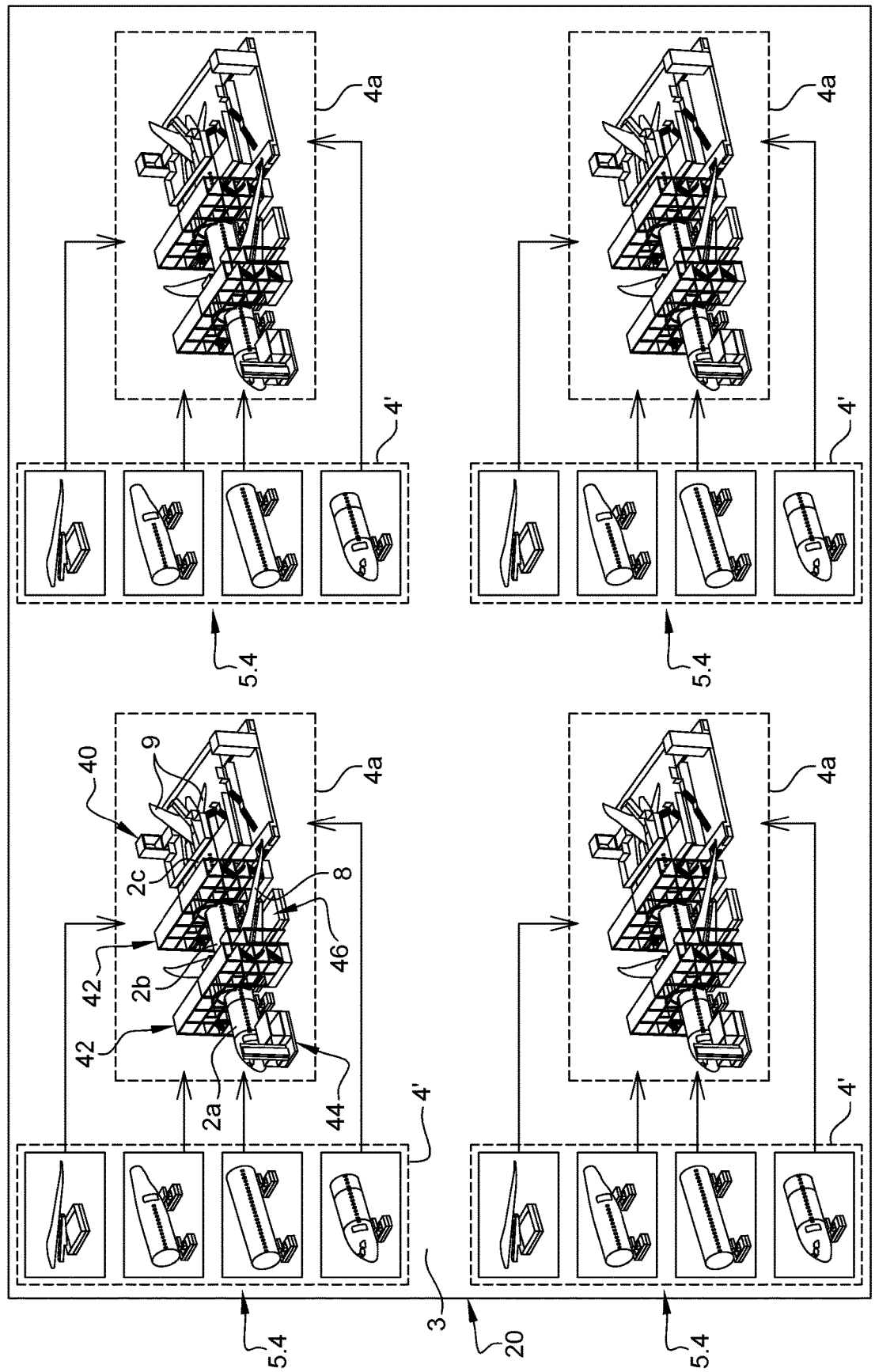
FIG. 14 represents a schematic perspective view of the assembly installation in a fourth configuration.

Referring now to FIG. 14, there is schematically represented the installation 20 in a fourth configuration preferably adopted during a phase of full technical maturity of the assembly campaign. This fourth configuration is represented with four assembly lines 5.4 on the floor 3 but the number of those lines functioning simultaneously could be higher.

In this fourth configuration of the installation 20 the first station 4a corresponds to the merging the three assembly stations 2a, 2b, 2c of the first configuration. In other words, in the fourth configuration the assembly line 5.4 amounts to a single station 4a in which all of the aforementioned fixing operations are carried out.

Consequently, the first and only station 4a receives from the storage space 4' the three sections 2a, 2b, 2c arranged end-to-end and the two wings 8. It also receives all the access structures 40, 42, 46.

Here also, the first station 4a of the fourth configuration may include an elevator 44 arranged to be mobile over the floor 3 in the vicinity of the cockpit to load hardware, equipment and/or tools into the fuselage.

Figure 15:
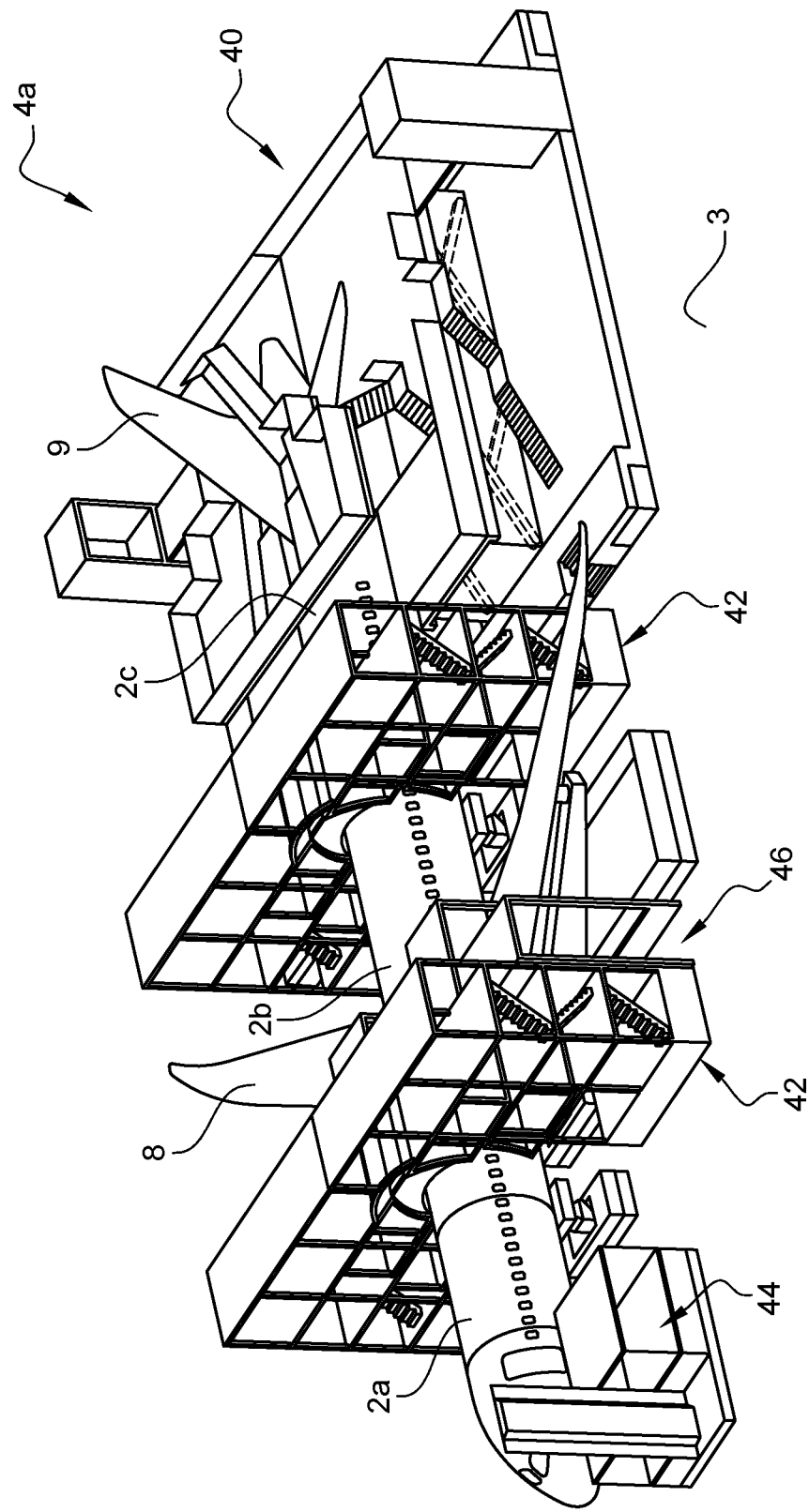
FIG. 15 represents a perspective view of the first assembly station of the installation in the fourth configuration shown in FIG. 14.
Figure 16:
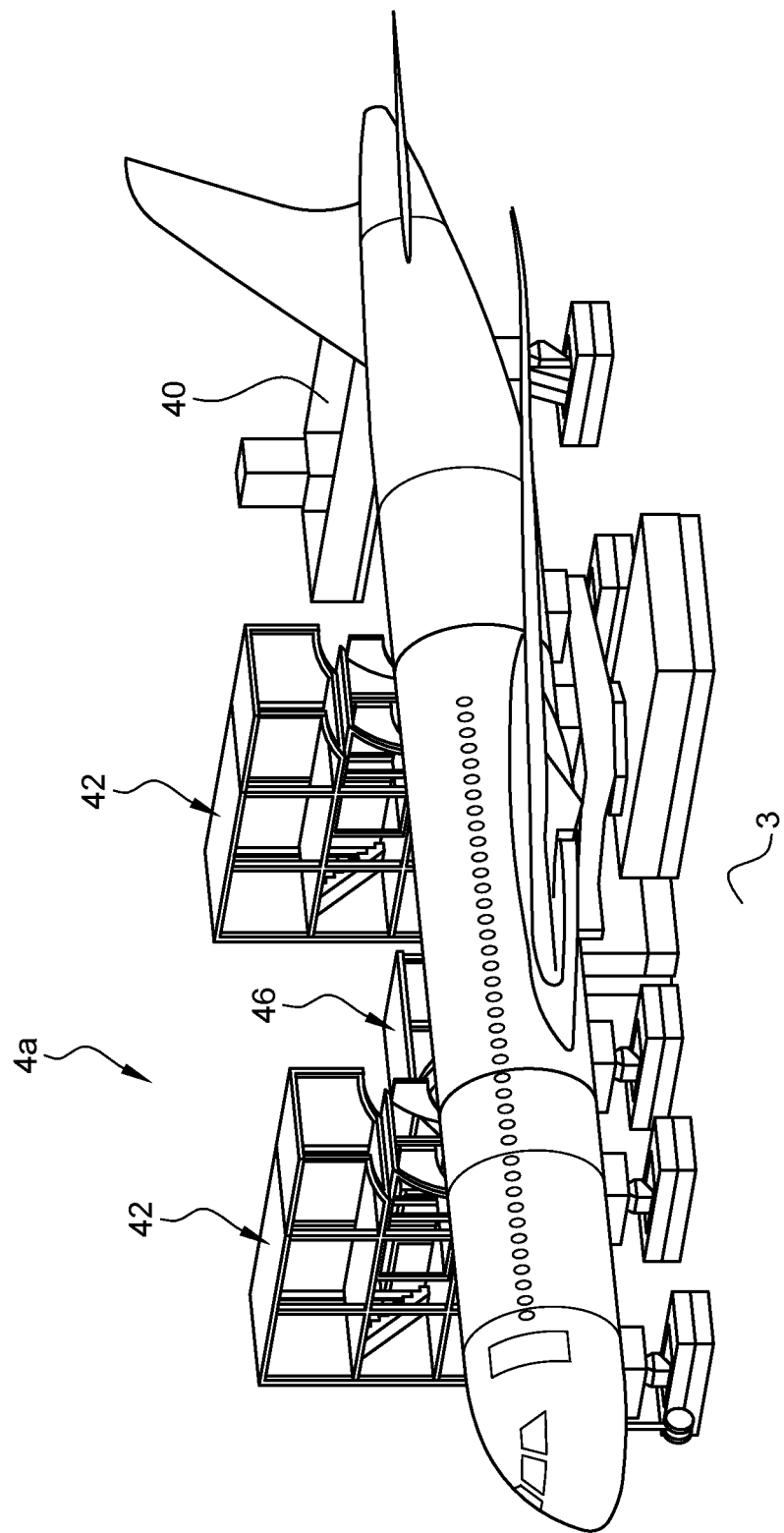
FIG. 16 represents a perspective view similar to that of FIG. 15 in which some of the equipment of the first station has intentionally been removed.
Figure 17:
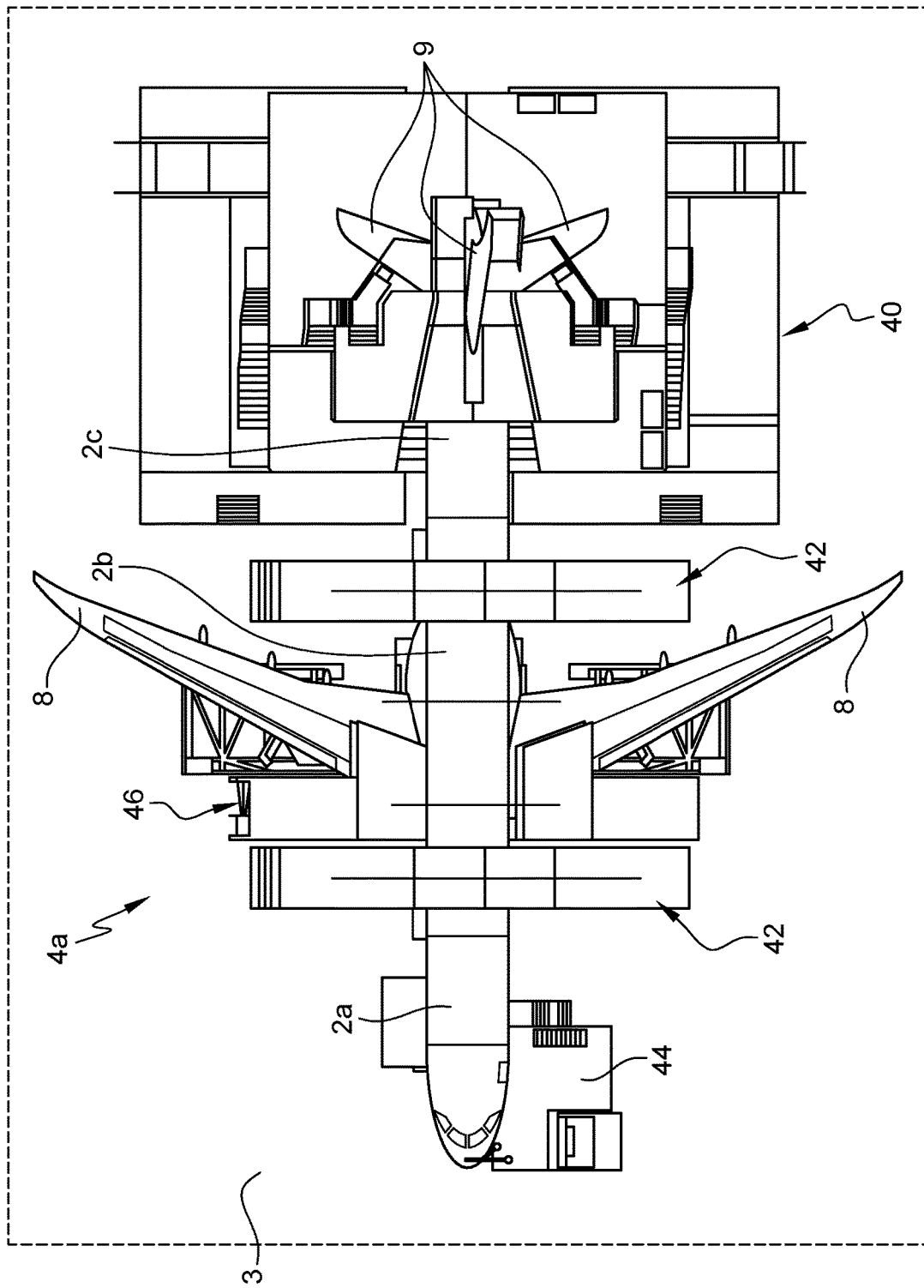
FIG. 17 represents a view from above of the first assembly station shown in FIGS. 14 through 16.

In this regard, FIGS. 15 through 17 show the station 4a in which all these access structures 40, 42, 46, are installed to carry out simultaneously the operations of assembling the sections 2a, 2b, 2c end-to-end, assembling the tail units 9 onto the rear section 2c, and assembling the wings 8 onto the central section 2b.

By grouping operations in this way the number of assembly lines 5.4 can be increased and the space in the hangar optimized.

Of course, diverse modifications may be made by the person skilled in the art to the disclosure herein that has just been described by way of nonlimiting and combinable example only and the scope of which is defined by the following claims.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A modulable aircraft assembly installation including a floor and a plurality of assembly stations distributed over the floor, the installation comprising:
    a plurality of access structures for accessing the aircraft during assembly of the aircraft, each structure of the plurality of access structures being mobile over the floor, and the plurality of access structures comprising:
        at least one access structure at an orbital junction between a first and a second fuselage section;
        at least one access structure at two junctions between the second fuselage section and each of two aircraft wings; and
        at least one access structure at at least one junction between a rear fuselage section and at least one tail unit;
    wherein the installation is configured to adopt a plurality of distinct configurations, each having a different distribution of the access structures between the assembly stations; and
    a mobile fuselage section support including:
        a chassis mobile over the floor of the installation;
        a front support cradle for the second fuselage section mounted to be mobile longitudinally on the chassis;
        a rear support cradle for the second fuselage section mounted to be mobile longitudinally on the chassis; and
        a plurality of jacks for maintaining a shape of the second fuselage section, the maintaining jacks being mounted on the chassis and arranged longitudinally between the front support cradle and the rear support cradle and oriented vertically or substantially vertically.

2. The installation of claim 1, wherein the plurality of assembly stations is configured to adopt a first configuration defining at least one first assembly line and a plurality of first assembly lines each including successively:
    a first assembly station including the access structure to the at least one junction between the rear fuselage section and the at least one tail unit;
    a second assembly station including the at least one access structure to the orbital junction between the first and second fuselage sections; and
    a third assembly station including the access structure to the two junctions between the second fuselage section and each of the two aircraft wings.

3. The installation of claim 2, wherein the plurality of assembly stations is configured to adopt a second configuration defining at least one second assembly line and a plurality of second assembly lines each including successively:
    a first assembly station including the access structure to the at least one junction between the rear fuselage section and the at least one tail unit and the at least one access structure to the orbital junction between the first and second fuselage sections; and
    a second assembly station including the access structure to the two junctions between the second fuselage section and each of the two aircraft wings.

4. The installation of claim 2, wherein the plurality of assembly stations is configured to adopt a third configuration defining at least one third assembly line and a plurality of third assembly lines each including successively:
    a first assembly station including the at least one access structure to the orbital junction between the first and second fuselage sections; and
    a second assembly station including the access structure to the two junctions between the second fuselage section and each of the two aircraft wings and the access structure to the at least one junction between the rear fuselage section and the at least one tail unit.

5. The installation of claim 2, wherein the plurality of assembly stations is configured to adopt a fourth configuration defining at least one fourth assembly line and a plurality of fourth assembly lines each including a first assembly station including:
    at least one access structure to the orbital junction between the first and second fuselage sections;

the access structure to the two junctions between the second fuselage section and each of the two aircraft wings; and the access structure to the at least one junction between the rear fuselage section and the at least one tail unit.

6. The installation of claim 1, wherein each access structure to the aircraft, among the plurality of access structures, includes a plurality of working platforms and at least one staircase and/or at least one elevator.

7. The installation of claim 1, wherein each access structure to the aircraft among the plurality of access structures includes wheels for rolling over the floor, or sliders for sliding over the floor, or at least one air cushion.

8. The installation of claim 1, wherein each access structure to the aircraft among the plurality of the access structures is produced in a form of two lateral half-structures configured to adopt a separated position in which the two lateral half-structures are laterally separated from one another in order to allow introduction/extraction of the aircraft or of a part of the aircraft and a working position at which the two lateral half-structures provide access to the aircraft.

9. A method for changing configuration in an installation of claim 1, the method comprising passing from an initial configuration to a later configuration, and comprising:
   providing the modulable aircraft assembly installation according to claim 1;
   at least one step of grouping, in a same assembly station of the later configuration, a plurality of access structures of the plurality of access structures initially distributed in a plurality of distinct assembly stations of the initial configuration, the grouping being effected by moving over the floor at least one of the plurality of access structures initially distributed in the plurality of distinct assembly stations of the initial configuration; and/or
   at least one step of distributing, in a plurality of assembly stations of the plurality of assembly stations of the later configuration, a plurality of access structures of the plurality of access structures initially grouped in a same assembly station of the initial configuration, the distribution being effected by moving over the floor at least one of the plurality of access structures initially grouped in the same assembly station of the initial configuration.

* * * * *